(12) United States Patent
Kim

(10) Patent No.: US 9,817,517 B2
(45) Date of Patent: Nov. 14, 2017

(54) TOUCH DEVICE AND METHOD OF CONTROLLING THE SAME THAT CHANGES THE SENSITIVITY OF A TOUCH INPUT BASED ON THE TOUCH INPUT'S CAPACITANCE

(71) Applicant: HYUNDAI MOTOR COMPANY, Seoul (KR)

(72) Inventor: Sung Un Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 85 days.

(21) Appl. No.: 14/919,643

(22) Filed: Oct. 21, 2015

(65) Prior Publication Data
US 2016/0117043 A1 Apr. 28, 2016

(30) Foreign Application Priority Data
Oct. 22, 2014 (KR) ......................... 10-2014-0143298

(51) Int. Cl.
| G06F 3/045 | (2006.01) |
| G06F 3/041 | (2006.01) |
| G06F 3/044 | (2006.01) |
| G06F 3/0488 | (2013.01) |

(52) U.S. Cl.
CPC ............ *G06F 3/0418* (2013.01); *G06F 3/044* (2013.01); *G06F 3/0488* (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| 5,036,321 A * | 7/1991 | Leach | H03K 17/962 341/24 |
| 2005/0052426 A1* | 3/2005 | Hagermoser | B60K 35/00 345/173 |
| 2005/0110769 A1* | 5/2005 | DaCosta | G06F 3/0418 345/173 |
| 2011/0001628 A1* | 1/2011 | Miyazawa | G01C 21/3664 340/686.1 |
| 2011/0057899 A1* | 3/2011 | Sleeman | G01L 1/146 345/174 |
| 2011/0265245 A1 | 11/2011 | Asiaghi | |
| 2012/0306792 A1* | 12/2012 | Powers | G06F 3/044 345/173 |

(Continued)

FOREIGN PATENT DOCUMENTS

| JP | 2007-027034 A | 2/2007 |
| JP | 2008-033701 A | 2/2008 |

(Continued)

*Primary Examiner* — Ilana Spar
*Assistant Examiner* — Kirk Hermann
(74) *Attorney, Agent, or Firm* — McDermott Will & Emery LLP

(57) ABSTRACT

A touch device includes a first touch input receiving a touch and a second touch input acquiring a capacitance which occurs when the touch is inputted to the first touch input. A controller is configured to detect the touch inputted to the first touch input and to detect the acquired capacitance. The controller change touch sensitivity of the first touch input according to the detected capacitance.

15 Claims, 5 Drawing Sheets

(56) References Cited

U.S. PATENT DOCUMENTS

| | | | |
|---|---|---|---|
| 2013/0246861 A1* | 9/2013 | Colley | G06F 3/0488 714/48 |
| 2013/0328616 A1* | 12/2013 | Buttolo | H03K 17/955 327/517 |
| 2013/0328828 A1* | 12/2013 | Tate | G06F 3/044 345/174 |
| 2013/0342501 A1* | 12/2013 | Molne | G06F 3/0414 345/174 |
| 2014/0267085 A1* | 9/2014 | Li | G06F 3/041 345/173 |
| 2014/0267132 A1* | 9/2014 | Rabii | G06F 3/0418 345/174 |
| 2015/0123937 A1* | 5/2015 | Schenkewitz | H03K 17/962 345/174 |

FOREIGN PATENT DOCUMENTS

| | | |
|---|---|---|
| JP | 4419992 B2 | 2/2010 |
| KR | 10-2011-0137224 A | 12/2011 |
| KR | 10-2012-0018279 A | 3/2012 |
| KR | 10-2012-0048344 A | 5/2012 |
| KR | 10-2013-0029991 A | 3/2013 |
| KR | 10-2013-0061527 A | 6/2013 |
| KR | 10-2013-0090666 A | 8/2013 |
| KR | 10-2014-0113119 A | 9/2014 |
| WO | 2011/129109 A1 | 10/2011 |

\* cited by examiner

TOUCH DEVICE AND METHOD OF CONTROLLING THE SAME THAT CHANGES THE SENSITIVITY OF A TOUCH INPUT BASED ON THE TOUCH INPUT'S CAPACITANCE

CROSS-REFERENCE TO RELATED APPLICATION

This application claims the benefit of priority to Korean Patent Application No. 10-2014-0143298 filed in the Korean Intellectual Property Office on Oct. 22, 2014, the entire content of which is incorporated herein by reference.

TECHNICAL FIELD

The present disclosure relates to a touch device and a method of controlling the same. More particularly, the present disclosure relates to a touch device and a method of controlling the same that can perform a touch input even in a state of wearing a glove.

BACKGROUND

A touch sensor such as a capacitive touch sensor and an inductive touch sensor uses impedance sensing technology. Such a touch sensor has high touch sensitivity and durability and retains image quality, compared with a resistive touch sensor such as a pressure touch sensor.

The above described touch sensor detects a touch input using an electrical characteristic change which occurs when a user or a specific object contacts a touch surface, and thus, touch recognition deteriorates recognition when the user wears a glove or contacts a touch surface with a fingernail and the like.

In order to solve such detection deterioration, a glove having a conductive thread or a glove in which a conductive thread stitched in a fingertip portion, a thimble having conductivity, a touch pen, and a touch rod have been developed.

However, a special glove, a special thimble, or a touch exclusive pen is required to use the touch input, thus decreasing user inconvenience.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a touch device and a method of controlling the same capable of performing a touch input even in a state of wearing a glove.

According to an exemplary embodiment of the present inventive concept, a touch device includes a first touch input receiving a touch and a second touch input acquiring a capacitance when the touch is inputted to the first touch input. A controller is configured to detect the touch inputted to the first touch input and to detect the acquired capacitance. The controller may change touch sensitivity of the first touch input according to the detected capacitance. The controller may acquire the capacitance if a touch holding time of the touch is a predetermined time or more.

The second touch input may include a pressure sensor, and the controller may acquire the capacitance when a pressure of a predetermined level or more is detected through the pressure sensor.

The second touch input may be implemented in a push button form, and the controller may acquire the capacitance when the push button is pressed.

The first touch input may include a touch sensor that outputs an electrical signal to correspond to a capacitance change when the touch is inputted. A touch controller is configured to detect a node in which a capacitance change amount is a threshold value or more based on the electrical signal to acquire a touch area.

The controller may control the threshold value to change the touch sensitivity of the first touch input.

The touch controller may detect a central point of the touch area as a touch point and correct the touch point by moving the touch point upward when the capacitance decreases.

The touch device may further include a display that displays through a graphical user interface. The controller may change a size of a touch recognition area for selecting a graphic object included in the graphical user interface to correspond to a location of the corrected touch point.

The first touch input may include a noise reduction filter that reduces a noise when the touch is inputted. The controller may change a filter parameter of the noise reduction filter as the touch sensitivity increases to improve noise reduction performance.

The second touch input unit may be disposed at a steering wheel.

According to another embodiment of the present inventive concept, a method of controlling a touch device includes acquiring a capacitance occurring when a touch is inputted. Touch sensitivity is changed based on the acquired capacitance. A touch area is changed from the touch based on the touch sensitivity.

The method may further include entering a touch correction mode when the touch is maintained for a predetermined time or more.

The method may further include entering a touch correction mode when a pressure by the touch is detected through a pressure sensor.

The method may further include entering a touch correction mode when a push button is pressed by the touch.

The step of acquiring the touch area may include detecting a capacitance change amount occurring when the touch is inputted. The touch area is acquired by detecting a node in which the capacitance change amount is a threshold value or more.

The step of changing the touch sensitivity may include changing the touch sensitivity by changing the threshold value.

The step of acquiring the touch area may include detecting a central point of the touch area as a touch point and correcting the touch point by moving the touch point upward when the capacitance decreases.

The method may further include changing a size of a touch recognition area for selecting a graphic object included in a graphical user interface to correspond to a location of the corrected touch point.

The method may further include changing a filter parameter of a noise reduction filter that reduces a noise when the touch is inputted according to the touch sensitivity.

The step of changing the filter parameter may include changing the filter parameter as the touch sensitivity increases to improve noise reduction performance.

According to the exemplary embodiments of the present inventive concept, user convenience can be enhanced by adjusting touch sensitivity to be appropriate to a user's present state. Particularly, when it is difficult to manipulate touch without a glove, a driver can easily perform the touch manipulation while wearing the glove.

DETAILED DESCRIPTION OF THE EMBODIMENTS

Figure 1:
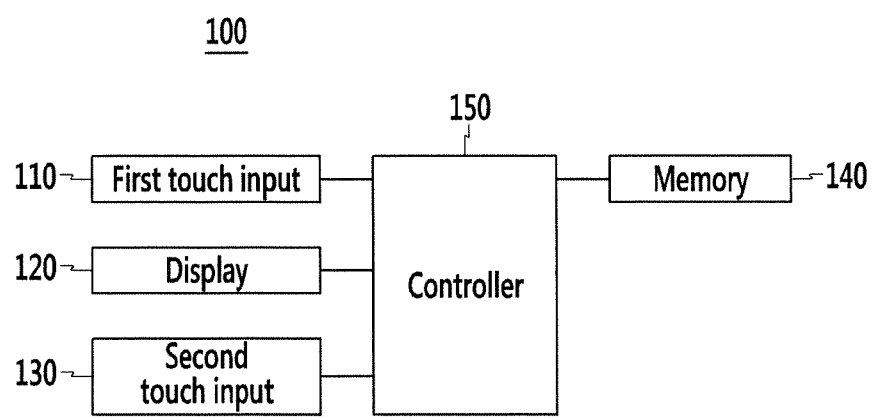
FIG. 1 is a block diagram illustrating a configuration of a touch device according to an exemplary embodiment of the present inventive concept.

The present disclosure will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, a touch device and a method of controlling the same according to an exemplary embodiment of the present inventive concept will be described with reference to necessary drawings.

Figure 2:
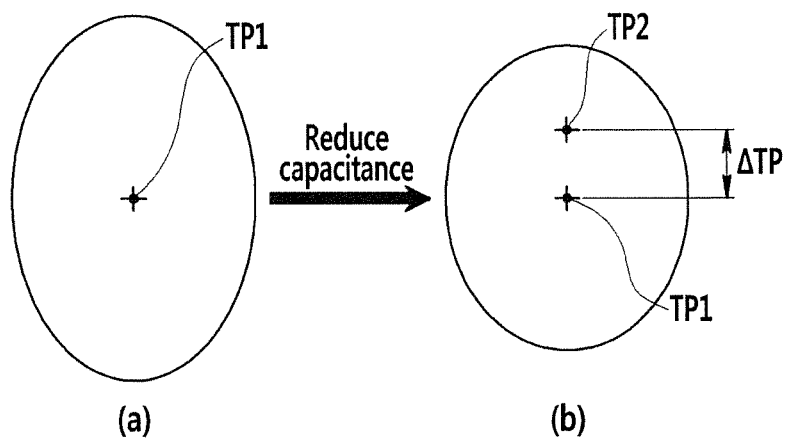
FIG. 2 is a diagram illustrating a method of correcting a touch point in a touch device according to an exemplary embodiment of the present inventive concept.
Figure 3:
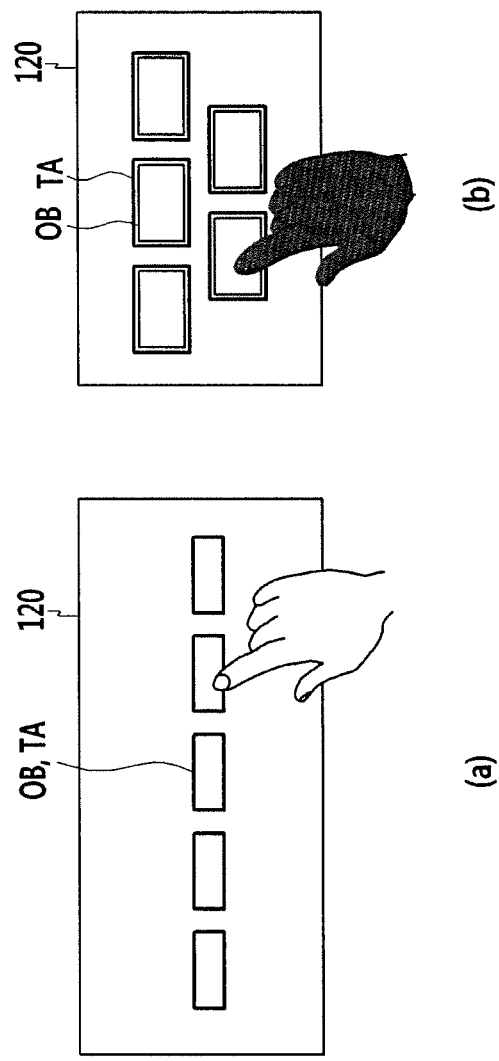
FIG. 3 is a diagram illustrating a method of controlling a graphical user interface in a touch device according to an exemplary embodiment of the present inventive concept.
Figure 4:
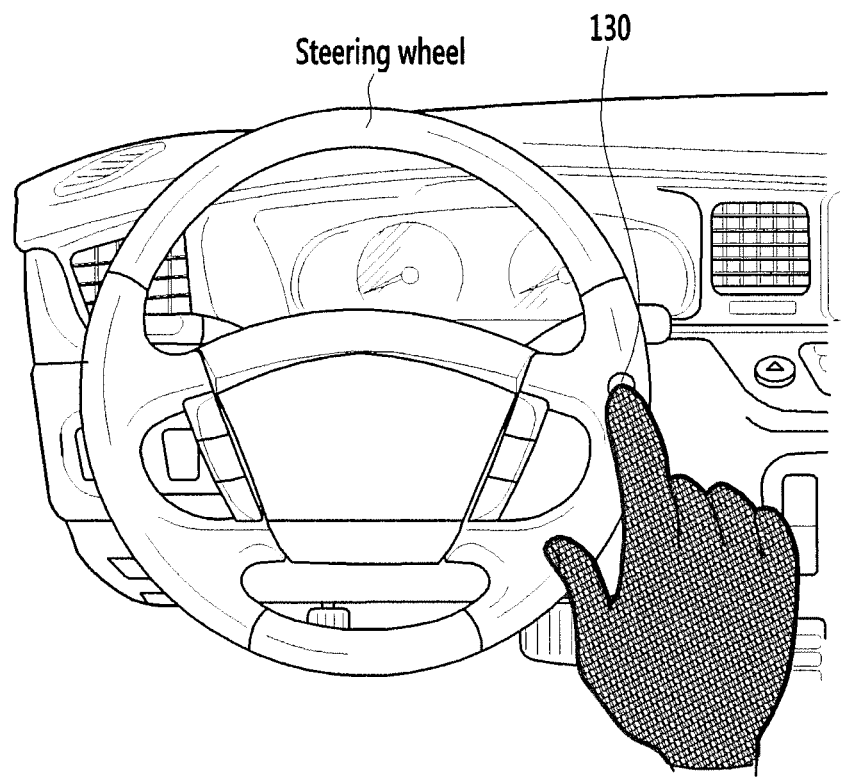
FIG. 4 is a diagram illustrating an example of disposing a correction touch sensor at a steering wheel of a vehicle according to an exemplary embodiment of the present inventive concept.

FIG. 1 is a block diagram illustrating a configuration of a touch device according to an exemplary embodiment of the present inventive concept. FIG. 2 is a diagram illustrating a method of correcting a touch point in a touch device according to an exemplary embodiment of the present inventive concept. FIG. 3 is a diagram illustrating a method of controlling a graphical user interface (GUI) in a touch device according to an exemplary embodiment of the present inventive concept. FIG. 4 is a diagram illustrating an example of disposing a correction touch sensor at a steering wheel of a vehicle according to an exemplary embodiment of the present inventive concept.

Referring to FIG. 1, a touch device 100 according to an exemplary embodiment of the present inventive concept may include a first touch input 110, a display 120, a second touch input 130, a memory 140, and a controller 150. Constituent elements of FIG. 1 are not essential elements, and thus, a touch device according to an exemplary embodiment of the present inventive concept may include more than or less constituent elements than those of FIG. 1.

The first touch input 110 is a user input device that receives a touch input occurring by a touch input means. The touch input means is an object that performs a touch action, and may include a finger, a finger that wears a glove, a touch rod, a touch pen, and a thimble.

The first touch input 110 may operate with a capacitance touch technology. Such a touch input 110 may include a touch controller (not shown) and a touch sensor (not shown) for detecting touch occurrence. The touch sensor is implemented in a form of a touch film, a touch sheet, a touch pad, and a touch panel, and may include a plurality of driving electrodes and a plurality of detection electrodes.

The touch sensor using the capacitance touch technology outputs an electrical signal to correspond to a node capacitor that is generated at an intersection between a driving electrode and a detection electrode. The touch controller may receive the electrical signal and recognize the touch input.

When the first touch input 110 is touched by the touch input means, in at least one node (an intersection between a driving electrode and a detection electrode) of the touch sensor, a capacitance of the node capacitor is changed.

By analyzing the electrical signal output from the touch sensor, the touch controller detects a node in which a capacitance change amount is a threshold value or more and acquires a touch area based on an XY coordinate area of the detected node. Further, the touch controller acquires a touch point from the touch area and transfers coordinates of the touch area or coordinates of the touch point to the controller 150.

The touch point may correspond to a node in which a capacitance change amount is a peak value or a central point of the touch area. In a case of the central point of the touch area, a noise that is included in the capacitance change amount is leveled off, thus reducing the noise.

The first touch input 110 may further include a noise reduction filter for reducing the noise in the touch sensor.

The display 120 displays information that is processed in the touch device 100.

For example, the display 120 may display through a user interface (UI) or a graphical user interface (GUI) of the touch device 100. The display 120 is coupled to the first touch input 110 in an interlayer structure to form a touch screen. The touch screen represents a display that can perform a touch input.

The second touch input 130 is a touch input device for correcting touch sensitivity of the first touch input 110, and may acquire a capacitance occurring by the touch input means instead of distinguishing a touch area or a touch point. The second touch input 130 may include a correction touch sensor of a capacitance method and a correction touch controller. The correction touch sensor may include at least one driving electrode and at least one detection electrode.

When a touch by the touch input means occurs, the correction touch sensor outputs the electrical signal corresponding to the capacitance change of the node capacitor at each node to the correction touch controller. The correction touch controller may analyze the electrical signal received from the correction touch sensor and calculate a capacitance between the correction touch sensor and the touch input means. That is, the correction touch controller calculates the capacitance occurring in the correction touch sensor by a touch manipulation of the touch input means.

The second touch input 130 may detect a capacitance occurring by the touch input means when entering a touch correction mode and output the capacitance to the controller 150.

If a touch holding time of the touch input means to the correction touch sensor is a predetermined time or more, the second touch input 130 may enter a touch correction mode.

The second touch input 130 may be implemented in a push button form in which the correction touch sensor is disposed at one surface. In this case, as the push button is pressed by the touch input means, the second touch input 130 may enter the touch correction mode.

The second touch input 130 may further include a pressure sensor. In this case, as a pressure in which the touch input means presses a touch surface is detected by a pressure sensor, the second touch input 130 may enter the touch correction mode.

In the present, a case of calculating the capacitance between the touch input means and the correction touch sensor of the second touch input 130 in the correction touch controller is described, but the present disclosure is not limited thereto. For example, the correction touch controller may transfer information corresponding to the capacitance change amount of the correction touch sensor to the controller 150, and the controller 150 may calculate the capacitance between the correction touch sensor and the touch input means based on the transferred information.

Further, in the present invention, a case of separately having the touch controller of the first touch input 110 and the correction touch controller of the second touch input 130 is described, but the second touch input 130 may be implemented to share the first touch input 110 and the touch controller. That is, the touch sensor of the first touch input 110 and the correction touch sensor of the second touch input 130 may divide and use channels of the touch controller. In this case, because it is unnecessary to implement a separate touch controller for the second touch input 130, by providing the second touch input 130, thus preventing cost and size of the touch device 100 from increasing.

Further, in the present invention, when the first touch input 110 and the second touch input 130 are separately implemented is illustrated, but the second touch input 130 may be included in the first touch input 110. When the touch correction mode is entered, the first touch input 110 may drive a partial node of the touch sensor with the second touch input 130. That is, by driving nodes which include the touch sensor of the first touch input 110 with the node of the second touch input 130, the nodes may be used for calculating the capacitance for touch correction.

The memory 140 may store a program for operation of the controller 150 and store various data that are processed in the touch device 100.

The memory 140 may form and store sensitivity information in a database on a capacitance basis occurring by the touch input means. Here, sensitivity information corresponds to touch sensitivity of the first touch input 110, and the touch sensitivity may be determined by a threshold value to be a reference that distinguishes the touch area in the touch controller of the first touch input 110.

The threshold value to distinguish the touch area in the first touch input 110 is a parameter that determines touch sensitivity of the first touch input 110. In the first touch input 110, as the threshold value decreases, the capacitance change amount that distinguishes the touch area also decreases, thus increasing touch sensitivity. However, in the first touch input 110, as the threshold value increases, the capacitance change amount that distinguishes the touch area increases, and the touch sensitivity reduces.

The memory 140 may form and store a touch point compensation value in the database on the capacitance basis occurring by the touch input means.

Hereinafter, a method of correcting a touch point according to a capacitance occurring by the touch input means will be described with reference to FIG. 2.

FIG. 2(a) shows a location of a touch point when touching the first touch input 110 with a finger without a glove, and FIG. 2(b) represents a location of the touch point when touching the first touch input 110 with the finger in a glove.

Referring to FIG. 2(a), when a glove is not used for performing a touch action, a central point of the touch area is used as a touch point TP1.

When a central point of the touch area is used as the touch point with the glove, a touch point may be covered by the glove according to a thickness of the glove.

As a distance between the finger and the touch sensor increases, a capacitance between the finger and the touch sensor decreases. Accordingly, when the glove is used, as a thickness of the glove increases, a distance between the finger and the touch sensor increases and thus the capacitance between the finger and the touch sensor reduces.

According to the exemplary embodiment of the present inventive concept, a touch point compensation value may be set according to a capacitance between the touch input means that performs a touch action and the touch sensor, and a touch point may be corrected using the touch point compensation value. Referring to FIG. 2(b), when a touch action is performed with a finger wearing a glove, a touch point compensation value ΔTP is determined based on a capacitance between the finger wearing a glove and the touch sensor. A touch point TP2 may be set to move upward by a touch point compensation value ΔTP from a central point TP1 of the touch area.

Referring back to FIG. 1, the memory 140 may form and store a GUI in the database on the capacitance occurred by the touch input means.

Hereinafter, a method of changing a GUI according to a capacitance occurring by the touch input means will be described with reference to FIG. 3.

FIG. 3(a) illustrates an example of a GUI of a case of touching the first touch input 110 with a finger in a state in which a glove is not worn, and FIG. 3(b) illustrates an example of a GUI of a case of touching the first touch input 110 with a finger in a state of wearing a glove.

Referring to FIG. 3(a) of touching the same graphic object OB that is included in the GUI with the finger without the glove and FIG. 3(b) of touching with the finger with the glove, an object size and object arrangement may be different.

When touching the graphic object OB with the glove, the graphic object OB may be covered by the glove. Therefore, it is necessary to increase a size of the graphic object for performing the touch action, compared with when a touch action is performed in a state in which the glove is not worn. Further, as the OB size increases, arrangement of the graphic object may change. As shown in FIG. 2, when the touch point is corrected according to a capacitance, a display location of the OB may move to correspond to movement of the touch point.

Referring back to FIGS. 3(a) and 3(b), a size of a touch recognition area TA for selecting a graphic object OB may be different in a case of performing a touch action with a finger in a state in which a glove is not worn as in FIG. 3(a)

and performing a touch action with a finger in a state of wearing a glove as in FIG. 3(b). Referring to FIG. 3(a), when the glove is not worn for performing the touch action with the finger, the touch recognition area TA may be set to be the same size as that of the graphic object OB. However, when performing a touch action with a finger with the glove, the size of the touch recognition area TA may be set larger than that of the graphic object OB.

As described above, when performing the touch action with the glove, touch sensitivity of the first touch input 110 increases. When the touch sensitivity increases, a noise increases and thus touch accuracy decreases. Therefore, when performing the touch action with the glove, the touch recognition area TA may be set to have a larger size than that of the graphic object OB in order to minimize a touch recognition error.

As described above, as a distance between the finger and the touch sensor increases, a capacitance between a finger and the touch sensor decreases. Accordingly, as a thickness of the glove increases, a distance between the finger and the touch sensor increases and thus a capacitance between the finger and the touch sensor reduces.

Therefore, in the present invention, a GUI such as a size of a graphic object and a display location may be differently set according to a capacitance occurring by the touch input means that performs the touch action.

Referring back to FIG. 1, the controller 150 controls general operations of the touch device 100. The controller 150 detects a touch input through the first touch input 110, and may perform a corresponding function or may control a GUI based on the touch input.

Further, the controller 150 may determine entrance to a touch correction mode and control the second touch input 130 to detect a capacitance for touch correction when entering the touch correction mode.

When the touch action of the touch input means to the second touch input 130 is maintained for a predetermined time or more, the controller 150 may control the second touch input 130 to detect a capacitance by entering a touch correction mode.

When the second touch input 130 is implemented in a push button form, the controller 150 may control the second touch input 130 to detect a capacitance by entering the touch correction mode by pressing a push button.

When the second touch input 130 includes a pressure sensor that detects a pressure on a touch surface and the detected pressure the same or higher than a predetermined level, the controller 150 may control the second touch input 130 to detect the capacitance by entering the touch correction mode.

When the controller 150 detects the capacitance occurring by the touch input means through the second touch input 130, the controller 150 may control touch sensitivity of the first touch input 110 based on the capacitance. That is, when the controller 150 acquires a capacitance occurring by the touch input means through the second touch input 130, the controller 150 may control the first touch input 110 to change a touch area determination threshold value, which determines the touch sensitivity based on the capacitance. The changed threshold value may be stored at the memory 140.

When the controller 150 detects the capacitance occurring by the touch input means through the second touch input 130, the controller 150 may change a filter parameter of a noise reduction filter included in the first touch input 110 based on the capacitance. For example, when the filter parameter of the noise reduction filter represents a unit touch area, the controller 150 may change a size of the unit touch area based on the capacitance that is detected through the second touch input 130.

As described above, as the capacitance detected through the second touch input 130 decreases, the touch sensitivity of the first touch input 110 increases. As the touch sensitivity of the first touch input 110 increases, noise from touch data increases. Therefore, as the capacitance detected through the second touch input 130 decreases, i.e., as the touch sensitivity of the first touch input 110 increases, in order to enhance noise removal performance, the controller 150 may change a filter parameter of the noise reduce filter. For example, when the filter parameter of noise reduction filter represents the unit touch area, as the touch sensitivity of the first touch input 110 increases, the controller 150 increases a size of the unit touch area, thereby improving noise reduction performance.

As touch sensitivity of the first touch input 110 is changed, the controller 150 may control the display 120 to change the GUI displayed in the display 120. That is, the controller 150 may read a corresponding GUI from the memory 140 based on the capacitance between the touch input means that is detected by the second touch input 130 and the touch sensor and display the GUI in the display 120.

The touch device 100 having the foregoing configuration may be applied to a television, a smart phone, a laptop computer, a navigation device, a tablet personal computer (PC), and a vehicle operation system.

When the touch device 100 is included in a vehicle control system, the touch sensor of the second touch input 130 may be mounted in a steering wheel, as shown in FIG. 4. When mounting the touch sensor of the second touch input 130 in the steering wheel, a user may contact the touch sensor of the second touch input 130 with an action in which the user holds a steering wheel by driving a vehicle and thus the user approaches to the second touch input 130 can be improved. Further, before the vehicle starts, by completing a process of correcting touch sensitivity of the first touch input 110, while the user drives the vehicle, in order to correct touch sensitivity of the first touch input 110, user's attention can be prevented from being distracted.

Figure 5:
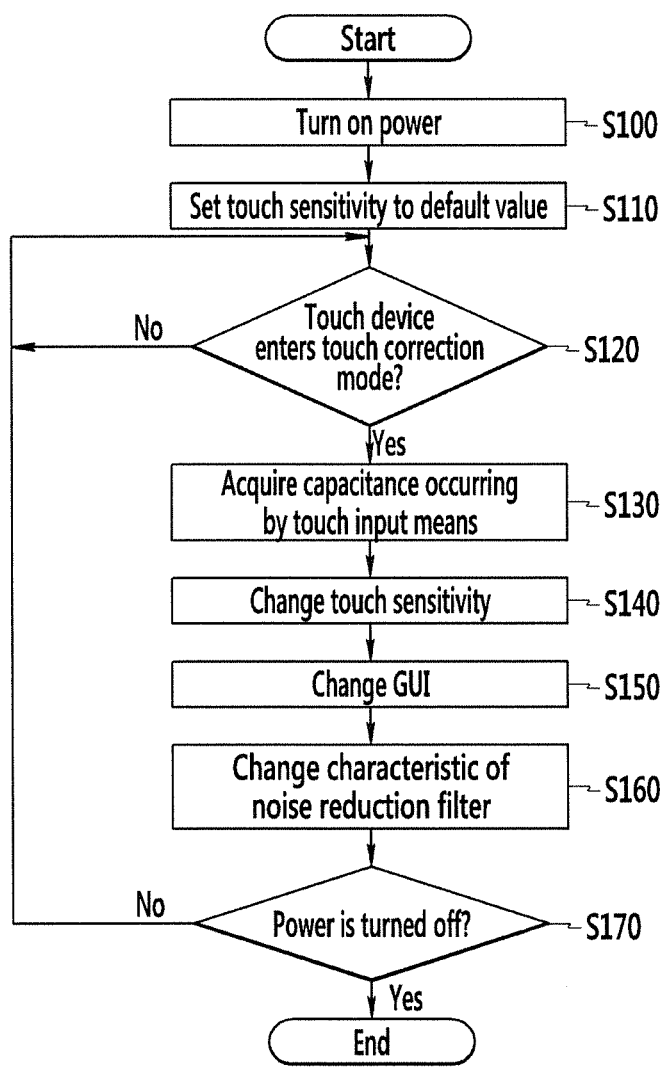
FIG. 5 is a flowchart illustrating a method of controlling a touch device according to an exemplary embodiment of the present inventive concept.

FIG. 5 is a flowchart illustrating a method of controlling a touch device according to an exemplary embodiment of the present inventive concept.

Referring to FIG. 5, when power is turned on (S100), the touch device 100 sets touch sensitivity of the first touch input 110 to be a default value (S110).

At step S110, the touch sensitivity is determined by the default value to distinguish the touch area in the first touch input 110, and as the default value decreases, the touch sensitivity increases.

Further, at step S110, the default value of the touch sensitivity is an initial value set when producing the touch device 100, and may be a value that is set to correspond to a case of touching with a finger.

FIG. 4 illustrates a case of setting touch sensitivity of the first touch input 110 to a default value when power of the touch device 100 is turned on, but when power of the touch device 100 is turned on, the touch sensitivity of the first touch input 110 may be set before power turns off.

Referring back to FIG. 5, the touch device 100 continuously determines whether the touch device 100 enters a touch correction mode (S120).

At step S120, the touch device 100 may control entrance to the touch correction mode based on a touch holding time of the touch input means on a touch surface of the second touch input 130, a pressing state of a push button that is coupled in an integral form with the second touch input 130, and whether a pressure is detected on the touch surface by the second touch input 130.

When the entrance to the touch correction mode is determined through step S120, the touch device 100 acquires a capacitance occurring by a touch of the touch input means through the second touch input 130 (S130). That is, the touch device 100 acquires the capacitance generated between the correction touch sensor of the second touch input 130 and the touch input means.

When the capacitance is acquired by a touch of the touch input means, the touch device 100 changes the touch sensitivity of the first touch input 110 to correspond to the touch input means based on the capacitance (S140). When the touch sensitivity is changed, the touch device 100 terminates a touch correction mode and detects a touch area and a touch point based on the changed touch sensitivity.

At step S140, as the capacitance occurring by the touch input means decreases, the touch device 100 may increase the touch sensitivity of the first touch input 110.

As the touch sensitivity of the first touch input 110 is changed, the touch device 100 changes a GUI displayed in the display 120 to correspond to the touch sensitivity change (S150).

At step S150, the touch device 100 may read a GUI corresponding to a capacitance that is acquired through step S140 from the memory 140, output the GUI in the display 120, and change the GUI that is displayed in the display 120.

Further, as the touch sensitivity is changed, the touch device 100 may change a filter characteristic of a noise reduction filter of the first touch input 110 (S160).

At step S160, as the touch sensitivity increases, touch noise also increases, and thus as the touch sensitivity increases, the touch device 100 may control the noise reduction filter to improve filter performance thereof.

The touch device 100 determines whether power is turned off (S170). Steps S120 to S160 may be repeatedly performed until power of the touch device 100 is turned off. Accordingly, whenever a user wants, the touch device 100 can easily change touch sensitivity of the first touch input 110.

In the foregoing exemplary embodiment of the present inventive concept, when performing the touch action with a hand wearing a glove, a case of enhancing a touch detection ratio by adjusting a touch sensitivity height is described, but the touch device 100 may improve a touch detection ratio by adjusting the touch sensitivity even to a case in which a touch detection ratio is deteriorated due to a long fingernail or due to a foreign substance on a finger.

Particularly, when the user drives a vehicle while wearing the glove, the touch device 100 supports manipulation, thereby improving user convenience.

A method of controlling a touch device according to the present disclosure may be executed through software. When the method is executed with software, constituent elements of the present disclosure are code segments that execute necessary work. A program or code segments may be stored at a processor readable medium, or may be transmitted by a computer data signal that is coupled to a carrier in a communication network or a transmitting medium.

A computer readable recording medium includes all kinds of record devices that store data that may be read by a computer system. A computer readable recording device may include, for example, a read-only memory (ROM), a random-access memory (RAM), a compact disc read-only memory (CD-ROM), a digital versatile disk-ROM (DVD_ROM), a digital versatile disk-RAM (DVD_RAM), a magnetic tape, a floppy disk, a hard disk, and optical data storage. Further, in the computer readable recording medium, codes that are distributed in a computer system that is connected to a network and that a computer may read with a distributed method may be stored and executed.

The foregoing drawings and a detailed description of the disclosure are illustration of the present invention and are used for describing the present disclosure, but are not used for limitation of meaning or for limiting the scope of the present disclosure described in the claims. Therefore, a person of ordinary skill in the art can easily select and replace from the foregoing drawings and the detailed description. Further, a person of ordinary skill in the art may omit some of constituent elements described in this specification without degradation of a performance or may add constituent elements in order to enhance performance. In addition, a person of ordinary skill in the art may change order of method steps described in this specification according to a process environment or equipment. Therefore, the scope of the present disclosure should be determined by the appended claims and their equivalents instead of a described implementation.

What is claimed is:

1. A touch device, comprising:
   a first touch input receiving a touch;
   a second touch input acquiring a capacitance when the touch is inputted to the first touch input; and
   a controller configured to detect the touch inputted to the first touch input and to detect the acquired capacitance, the controller changing touch sensitivity of the first touch input according to the acquired capacitance,
   wherein the first touch input unit comprises:
      a touch sensor outputting an electrical signal to correspond to a capacitance change which occurs when the touch is inputted; and
      a touch controller configured to detect a node in which a capacitance change amount is a threshold value or more based on the electrical signal to acquire a touch area,
   wherein the controller controls the threshold value to change the touch sensitivity of the first touch input, and
   wherein the touch controller detects a central point of the touch area as a touch point and corrects the touch point by moving the touch point upward when the capacitance decreases.

2. The touch device of claim 1, wherein the controller acquires the capacitance if a touch holding time of the touch is a predetermined time or more.

3. The touch device of claim 1, wherein the second touch input comprises a pressure sensor, and
   the controller acquires the capacitance when a pressure detected by the pressure sensor is a predetermined level or more.

4. The touch device of claim 1, wherein the second touch input is implemented in a push button, and
   the controller acquires the capacitance when the push button is pressed.

5. The touch device of claim 1, further comprising a display that displays through a graphical user interface,
   wherein the controller changes a size of a touch recognition area for selecting a graphic object included in the graphical user interface to correspond to a location of the corrected touch point.

6. The touch device of claim 1, wherein the first touch input comprises a noise reduction filter that reduces a noise when a touch is inputted, and the controller changes a filter parameter of the noise reduction filter as the touch sensitivity increases to improve noise reduction performance.

7. The touch device of claim 1, wherein the second touch input is disposed at a steering wheel.

8. A non-transitory medium having recorded thereon computer readable instructions for executing a method of controlling a touch device, the method comprising steps of:
   acquiring, by a controller, a capacitance occurring when a touch is inputted;
   changing, by the controller, touch sensitivity based on the capacitance; and
   acquiring, by the controller, a touch area from the touch based on the touch sensitivity,
   wherein the step of acquiring the touch area comprises steps of:
      detecting a capacitance change amount when the touch is inputted;
      acquiring the touch area by detecting a node in which the capacitance change amount is a threshold value or more; and
      detecting a central point of the touch area as a touch point and correcting the touch point by moving the touch point upward when the capacitance decreases.

9. The method of claim 8, further comprising a step of entering a touch correction mode when the touch is maintained for a predetermined time or more.

10. The method of claim 8, further comprising a step of entering a touch correction mode when a pressure by the touch is detected through a pressure sensor.

11. The method of claim 8, further comprising a step of entering a touch correction mode when a push button is pressed by the touch.

12. The method of claim 8, wherein the step of changing the touch sensitivity comprises a step of changing the touch sensitivity by changing the threshold value.

13. The method of claim 8, further comprising a step of changing a size of a touch recognition area for selecting a graphic object that is included in a graphical user interface to correspond to a location of the corrected touch.

14. The method of claim 8 further comprising a step of changing a filter parameter of a noise reduction filter that reduces a noise when the touch is inputted according to the touch sensitivity.

15. The method of claim 14 wherein the step of changing of the filter parameter comprises changing the filter parameter as the touch sensitivity increases to improve noise reduction performance.

* * * * *